Figure 1:
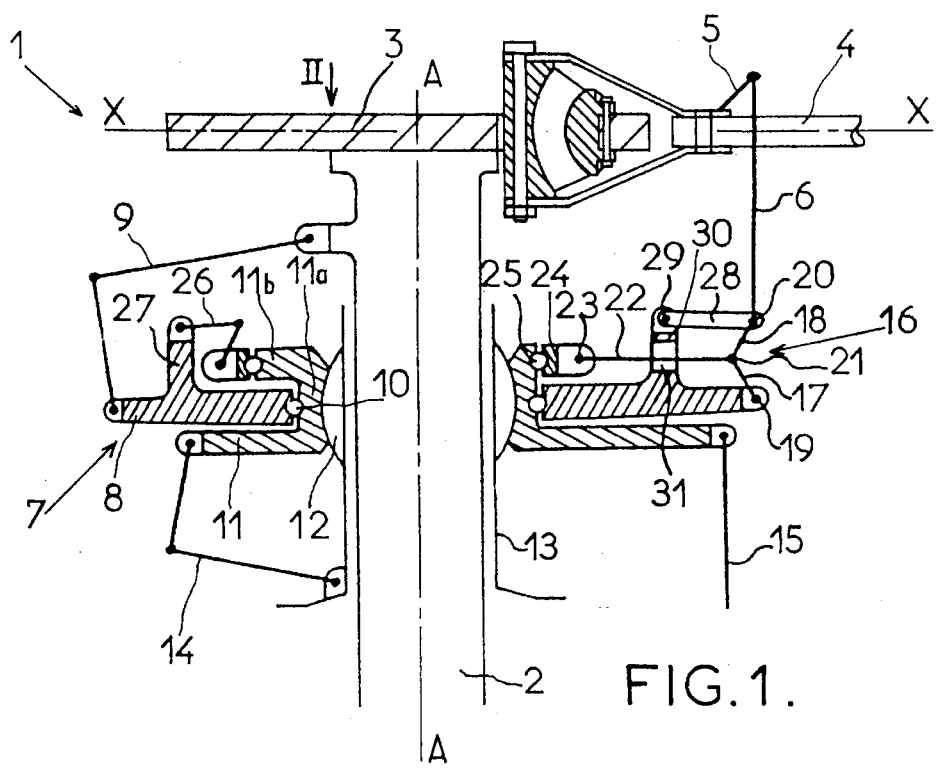

United States Patent [19]
Daldosso

[11] Patent Number: 5,599,167
[45] Date of Patent: Feb. 4, 1997

[54] DEVICE FOR CONTROLLING THE PITCH OF THE BLADES OF A ROTORCRAFT ROTOR

[75] Inventor: Louis J. Daldosso, Les Milles, France

[73] Assignee: Eurocopter France, France

[21] Appl. No.: 540,070

[22] Filed: Oct. 6, 1995

[30] Foreign Application Priority Data

Oct. 13, 1994 [FR] France .................................. 94 12229

[51] Int. Cl.$^6$ .................................................. B64C 11/34
[52] U.S. Cl. ...................... 416/108; 416/114; 416/168 R
[58] Field of Search .................................... 416/108, 109, 416/113, 114, 168 R, 168 A

[56] References Cited

U.S. PATENT DOCUMENTS

| | | | |
|---|---|---|---|
| 2,611,441 | 9/1952 | Slechta | 416/108 |
| 2,996,122 | 8/1961 | Slechta | 416/108 |
| 3,308,888 | 3/1967 | Arcidiacano | 416/114 |

FOREIGN PATENT DOCUMENTS 1505127 12/1966 France .
916894 9/1959 United Kingdom .

Primary Examiner—Edward K. Look
Assistant Examiner—Christopher Verdier
Attorney, Agent, or Firm—Larson and Taylor

[57] ABSTRACT

The device for controlling the pitch of the blades of a rotor using a mechanism having swashplates includes an auxiliary plate mounted on the non-rotating plate of the mechanism and which is secured in terms of rotation to the rotating plate of this mechanism and, for each blade, an articulated link in series with the corresponding pitch rod to which it is articulated, and including at least one arm articulated to the rotating plate, each articulated link being controlled by a lever articulated to it and to the auxiliary plate which is off-centered to the desired value so that each of the control levers controls the itch of the corresponding blade by applying a bicyclic component to it, the amplitude and phase of which component depend on the eccentricity of the auxiliary plate as defined with respect to the non-rotating plate.

20 Claims, 6 Drawing Sheets

DEVICE FOR CONTROLLING THE PITCH OF THE BLADES OF A ROTORCRAFT ROTOR

The invention relates to a device for controlling the pitch of the blades of a rotorcraft rotor, of the type having swashplates, in which each blade is, on the one hand, driven in rotation about an axis of rotation of a rotor mast via a hub, secured to the rotor mast, and, on the other hand, secured in terms of rotation about a longitudinal pitch-change axis of the blade to a pitch lever controlled by a pitch rod joined to a plate which rotates with the rotor mast and belongs to a swashplate mechanism, in which the rotating plate is mounted so that it can rotate on a non-rotating plate which can slide axially along the rotor mast and be inclined in any direction with respect to the rotor mast under the action of flight-control actuators.

The pitch-control device of the invention is particularly intended to equip a main rotor of a very high-speed helicopter, especially in forwards translational flight.

Independently of the pitch/flap and pitch/drag pairings, the devices for controlling the pitch of the blades of a helicopter rotor comprising a conventional mechanism with swashplates make it possible to achieve, in a reference frame which rotates with the rotor mast and the hub, on the one hand, a collective pitch given simultaneously to all the blades and, on the other hand, a cyclic pitch which is added to the collective pitch and applied to each blade at the rotational frequency.

It is known that the balance of the rotor, in order to ensure the balance and traction of a helicopter in forwards translational flight, is obtained by developing similar or even equal lift on the opposite sides of the rotor disc, on either side of the longitudinal axis of the helicopter, and by inclining the rotor disc towards the front of the helicopter. To this end, owing to the dissymmetry in the speeds between the advancing blade or blades, and the retreating blade or blades, with respect to the direction of travel of the helicopter, it is known to give the blades a cyclic pitch which decreases the pitch or the incidence of the advancing blade or blades while that of the retreating blade or blades is increased.

However, the extent to which these constraints of balance and of propulsion can be complied with is limited by the appearance of stall phenomena on the retreating or rear blade or blades, the pitch of which is too great, and of transonic shocks on the advancing or front blade or blades.

The operation of a rotor at very high speed is thus limited by the phenomena of stall and of drag divergence. According to studies carried out by the Assignee Company, approximately 15 to 20% of the developed power necessary for a flight of a helicopter at very high speed is consumed by the two aforementioned aerodynamic phenomena.

By way of example, for a helicopter with a mass of the order of 4250 kg at a speed of 360 km/h, the aforementioned studies show that the power consumed for this flight at very high speed can be split into:

60% of the power needed to overcome the drag of the fuselage,

5% of induced power needed for lift, and

35% of drag of the blade profiles, the essential operating limits of which are, on the one hand, stalling of the blade profiles at high angles of incidence, giving rise to a substantial increase in drag and to a loss in lift and, on the other hand, the transonic behaviour of the blade profiles at high Mach numbers, something which gives rise to drag divergence at zero lift.

A helicopter in very high-speed translational flight is especially confronted with these limits, owing to the substantial dissymmetry of the speeds between its advancing blade or blades, at a Mach number of between 0.5 and 0.9, and its retreating blade or blades, at a Mach number of between 0 and 0.3.

The aforementioned studies show that the stalling of the profiles and their transonic behaviour correspond to approximately 50% of the drag of the profiles, itself involved in the 35% of total power consumed. As a result, for this part of the power, potential savings which could be envisaged by solving the problems of the stalling of the profiles and of the transonic shocks increase to approximately 17% of this total power consumed.

The main object of the invention is to modify the pitch control provided in the conventional way by a swashplate mechanism, so as, to introduce a passive bicyclic pitch control, the phase and amplitude of which are driven by the device of the invention so as to adapt this bicyclic pitch control to the flight configuration, as reflected, for example, by datum points regarding the position of the flight controls and/or by datum values of certain flight parameters.

To this end, the device for controlling the pitch of the blades of a rotor according to the invention, of the type introduced hereinabove, is characterized in that it comprises:

an auxiliary plate, secured in terms of rotation to the rotating plate and mounted so that it can rotate with defined eccentricity on the non-rotating plate, and for each blade, an articulated link which comprises at least one arm via which it is joined to the rotating plate by a first articulation and which link is mounted in series with the corresponding pitch rod, in being joined to this pitch rod by a second articulation separate from the first articulation, as well as from a third articulation via which the articulated link is joined to a control lever, moreover articulated to the rotating and eccentric auxiliary plate so that the rotation of the latter induces, via each control lever, angular movements of each arm of the corresponding articulated link, which moves the pitch rod so as to control the pitch of the corresponding blade.

In particular, the phase and amplitude of the bicyclic component of pitch given to the blades may thus be adapted to the flight configuration.

According to a first embodiment architecture, each articulated link my comprise a single arm joined by an end part to one end of the corresponding pitch rod by the second articulation, and via its opposite end part to one of the first and third articulations of the articulated link respectively on the rotating plate and on an end part of the corresponding control lever, which lever is articulated via its opposite end part to the auxiliary plate, while the arm is articulated, between its end parts, to the other of the first and third articulations of the articulated link.

In this case, when the auxiliary plate is mounted axially between the rotating plate and the non-rotating plate it is advantageous, in order to simplify the way in which the articulations are produced, for the single arm of each articulated link to be Joined by the said opposite end part to the control lever by the third articulation and, between its end parts, to the rotating plate by the first articulation.

However, according to a second possible architecture, each articulated link may comprise two arms articulated together by a fourth articulation separate from the first articulation and second articulation, and a first arm of which is joined to the rotating plate by the first articulation and the second arm of which is joined to the corresponding pitch rod by the second articulation, the corresponding control lever being joined to at least one of the two arms by the third articulation, while a second lever is additionally articulated by a fifth articulation to the articulated link and/or the corresponding pitch rod and additionally to the rotating plate.

In this case, also so as to simplify the way in which the articulations are produced, it is advantageous that, for each articulated link, the third and fourth articulations be coincident and/or that the second and fifth articulations be coincident.

With this second architecture, if the rotating plate is mounted axially between the non-rotating plate and the auxiliary plate, it is advantageous for the rotating plate to exhibit, for each articulated link, a support on which one end of the second corresponding lever is articulated and through which the corresponding control lever passes.

In contrast, if the auxiliary plate is mounted axially between the non-rotating plate and the rotating plate, it is then advantageous for the rotating plate to exhibit, for each articulated link, a passage through which the corresponding control lever passes as well as a support to which one end of the second corresponding lever is articulated.

In the various architectures, it is advantageous for the auxiliary plate to be mounted so that it can rotate on the non-rotating plate with the aid of at least one rolling elements bearing which is off-centered with respect to the axis of the non-rotating plate.

The rotational drive of the auxiliary plate by the rotating plate may be provided either by means of at least one rotating scissors fitting articulated, on the one hand, to the rotating plate and, on the other hand, to the auxiliary plate, or by means of at least one control lever and of at least one arm of at least one corresponding articulated link. In the latter case, the control lever in question and the articulated link in question fulfil the function of a rotating scissors fitting.

In these various architectures too, the eccentricity of the auxiliary plate as defined with respect to the non-rotating plate may be fixed and predetermined by the structure of the plates and also by the way in which the auxiliary plate is mounted on the non-rotating plate, but it is advantageous for this defined eccentricity to be variable and determined by an off-centering system supported by the non-rotating plate so that the bicyclic component of the pitch of the blades is perfectly adapted to the instantaneous flight configuration.

To this end, and according to a simple structure, the off-centering system advantageously comprises, on the one hand, an intermediate plate held axially with respect to the non-rotating plate but mounted so that it can slide in a radial plane with respect to the non-rotating plate, and on which the auxiliary plate is mounted so that it can rotate with the aid of at least one rolling elements bearing and, on the other hand, at least two actuators supported by the non-rotating plate and each controlling the movements of the intermediate plate with respect to the non-rotating plate in respectively one of two different directions, in order to give the defined eccentricity to a moving assembly comprising the auxiliary plate, the intermediate plate and the rolling elements bearing or bearings interposed between them.

According to an advantageously simple structure for controlling the movements of the moving assembly with respect to the non-rotating plate, each of the two actuators is articulated via one end to the non-rotating plate, and via the other end close to one end of respectively one of two rods each articulated at its central part at a fixed point to the non-rotating plate, the other end of one of the rods being articulated at a fixed point to the intermediate plate so as to halt the latter in terms of rotation, while the other end of the other rod is articulated to a connecting rod also articulated at a fixed point to the intermediate plate.

As an alternative, the rotation of the intermediate plate may be halted by at least one non-rotating scissors fitting articulated, on the one hand, to the intermediate plate and, on the other hand, to the non-rotating plate, in which case each of the two rods is articulated via its other end to a respective connecting rod also articulated at a respective fixed point to the intermediate plate.

In these two cases, it is advantageous for the two actuators to be identical and for the two rods to be identical and each to move the intermediate plate in respectively one of two substantially mutually orthogonal directions.

In order to improve the speed and accuracy of the operation of the device of the invention, and to optimize the bicyclic pitch control, it is furthermore advantageous for the actuators to be controlled by at least one computer receiving at least signals regarding the positions of the flight controls and/or at least signals regarding the values of flight parameters. These actuators may be chosen from the known types of actuator comprising especially electric rams and servo controls.

In a simple example of how to mount the intermediate plate on the non-rotating plate, the intermediate plate is held axially on the non-rotating plate with the aid of at least one bolt passing through a tubular spacer piece located in a slot made in the intermediate plate so as to exhibit a clearance allowing the intermediate plate to slide with respect to the non-rotating plate in a radial plane with respect to the axis of the latter plate, under the control of the actuators of the off-centering system.

The essential advantage of the device for controlling the pitch of the blades of a helicopter rotor according to the invention is that it allows the passive bicyclic pitch control to be driven in terms of phase and in terms of amplitude in a way which is adapted to the flight configuration. By means of this passive bicyclic control, the occurrence of stalling on the retreating blade or blades of the rotor may be delayed, and power savings obtained not only near to the point of stalling of the rotor but more generally by the reduction of unfavourable effects which is obtained by decreasing the local angle of incidence of the retreating blades, pushing back a certain number of limits associated with the phenomenon of the stalling of the retreating blades, such as the level of vibration in the cabin, the dynamic moments along the blades, and the control forces.

It should additionally be noted that the device of the invention can be mounted as a retrofit upgrade on existing helicopter rotors, regardless of whether these rotors are of the hinged, see-saw or rigid type.

Figure 2:
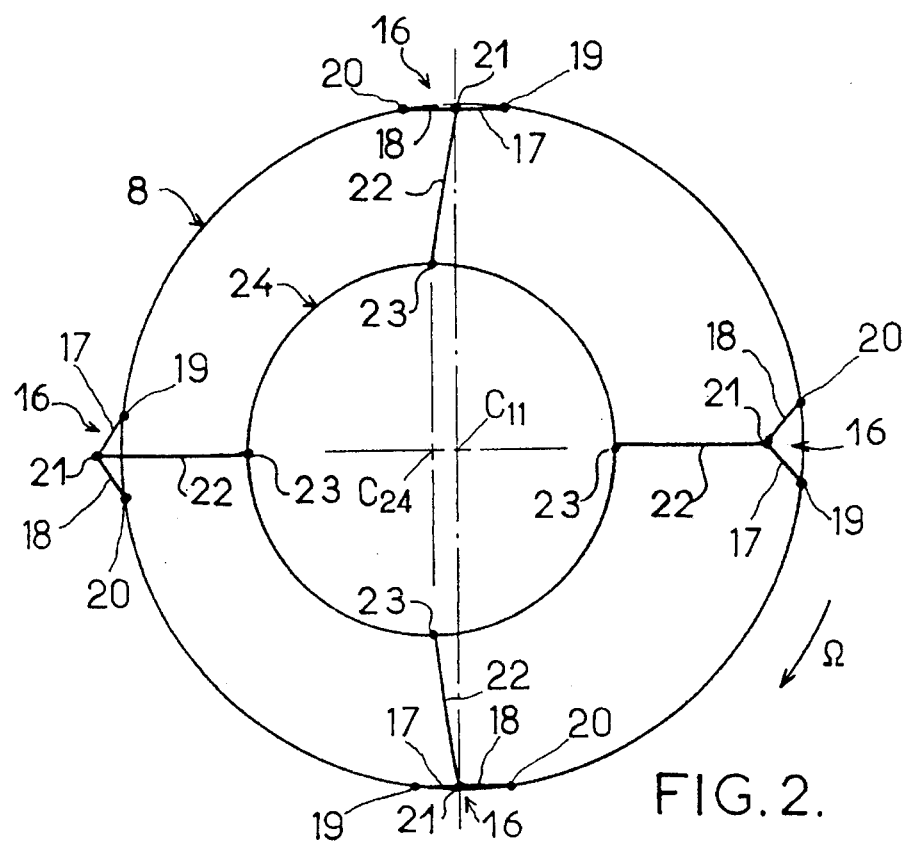
Figure 3:
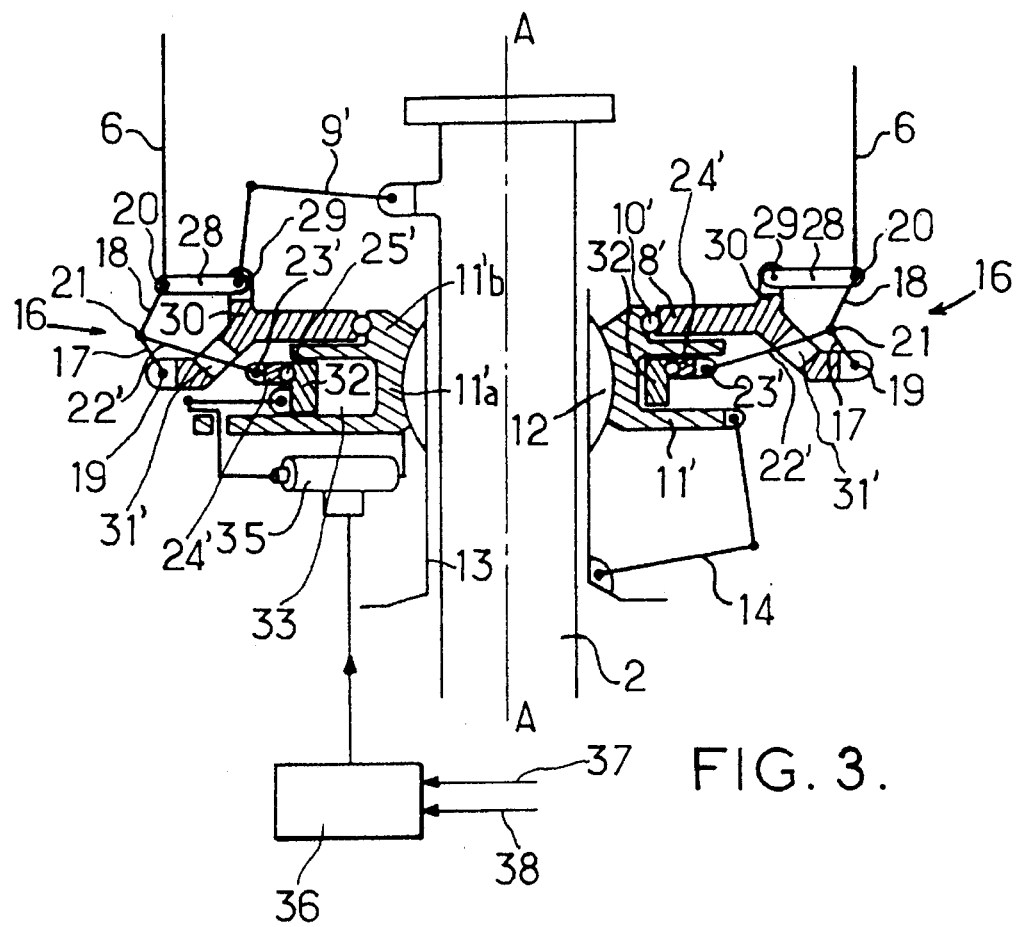
Figure 4:
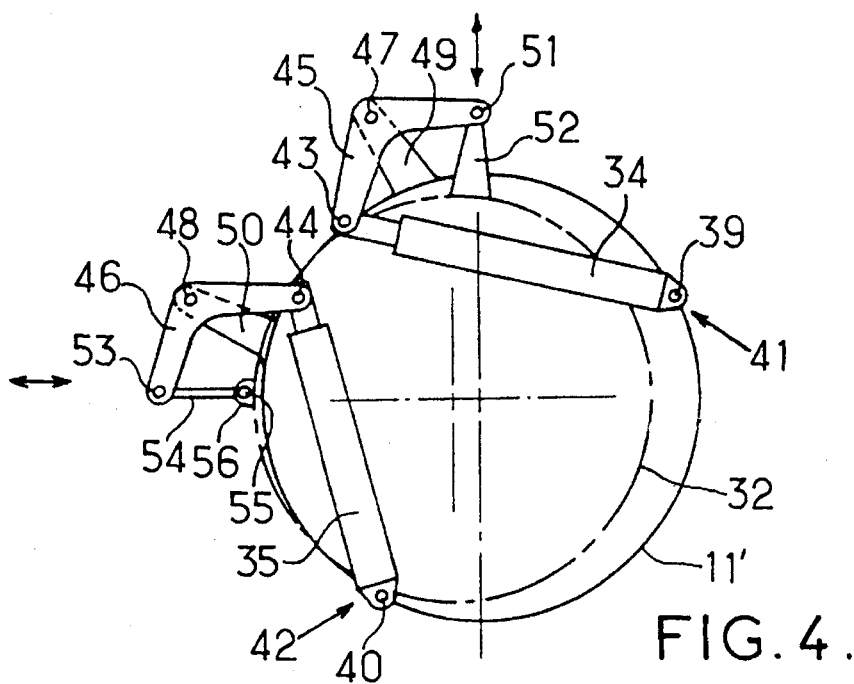
Figure 5:
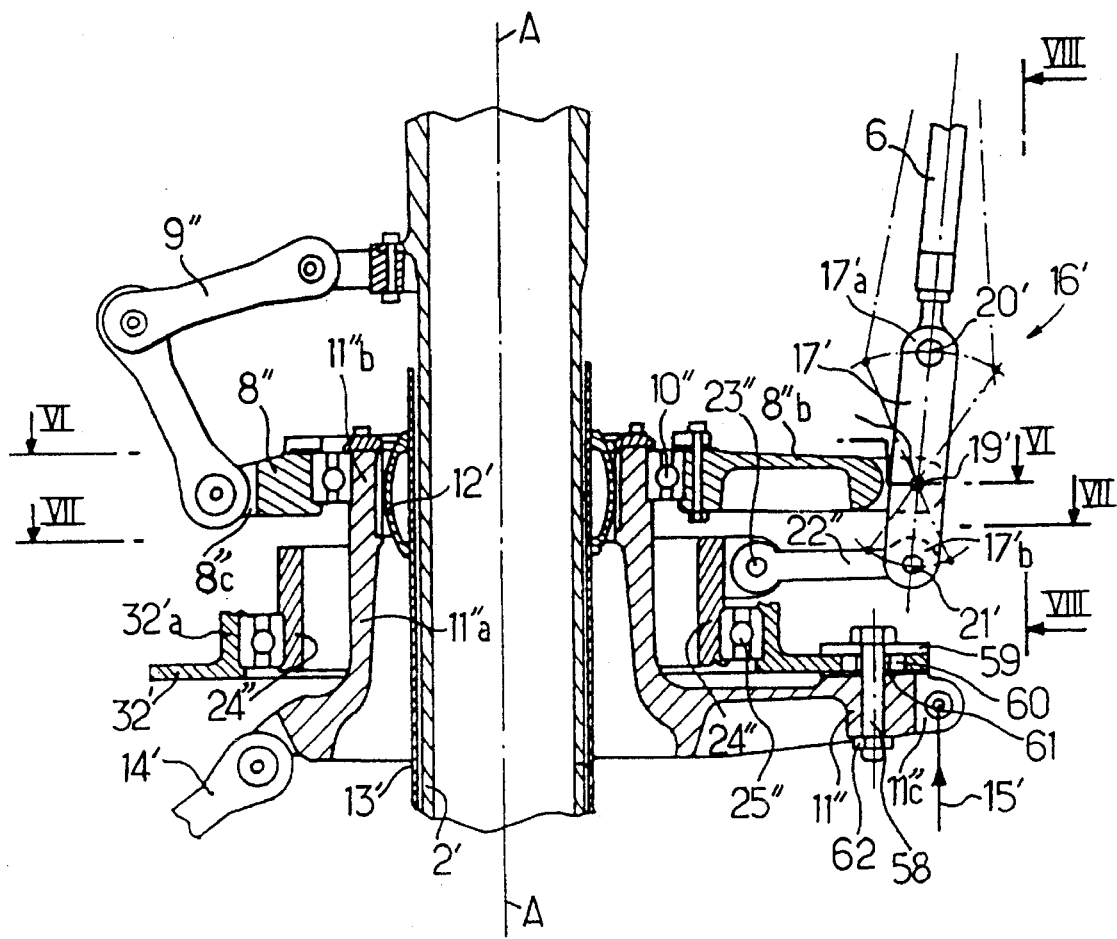
Figure 8:
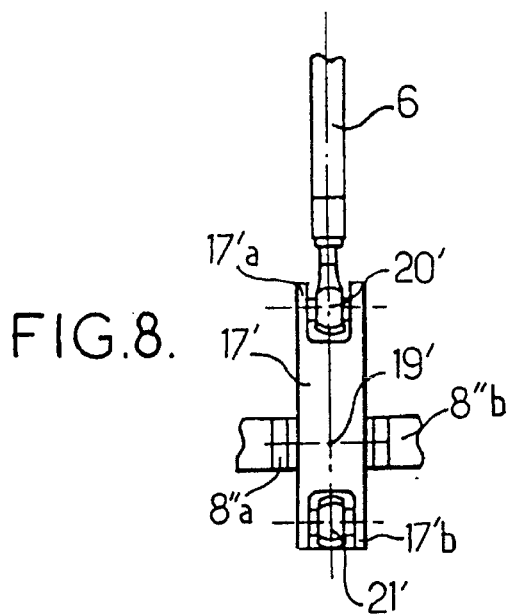
Figure 6:
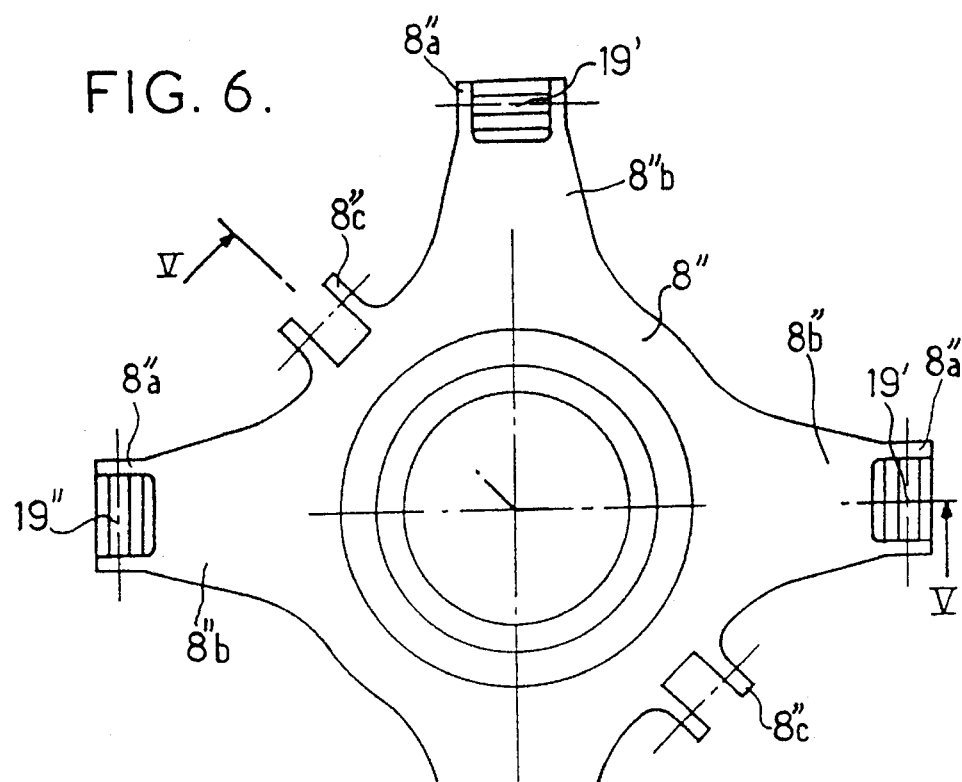
Figure 7:
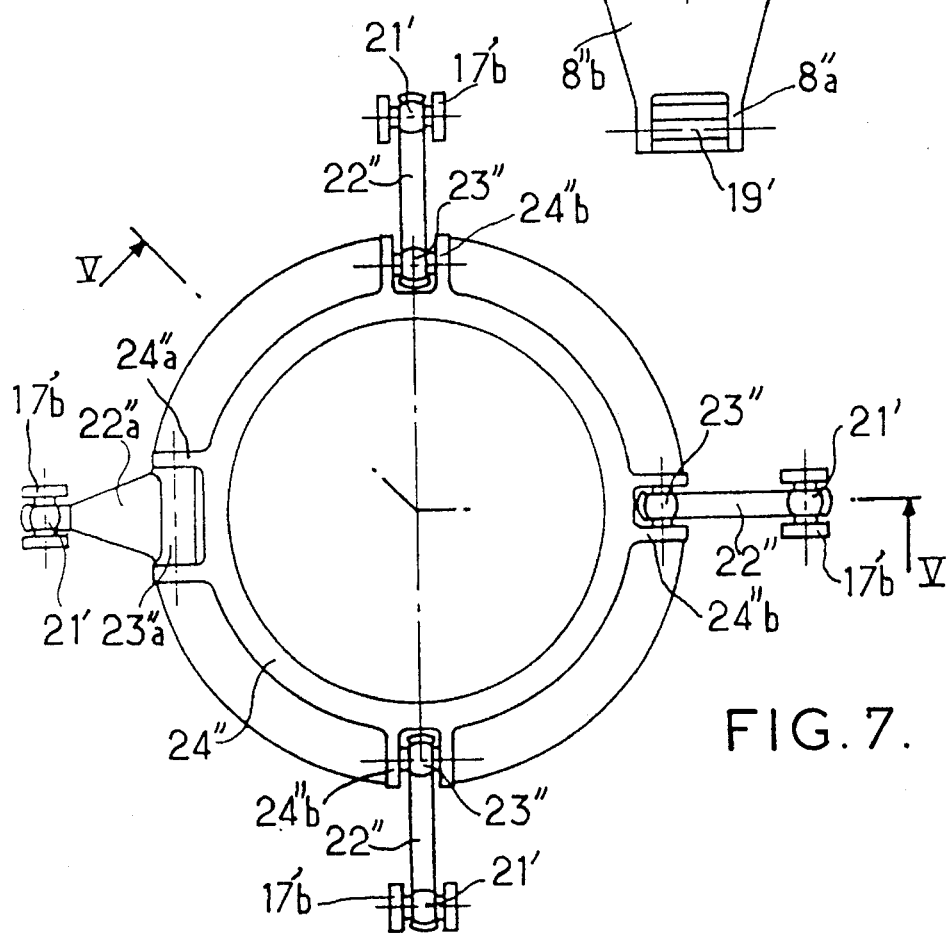
Figure 9:
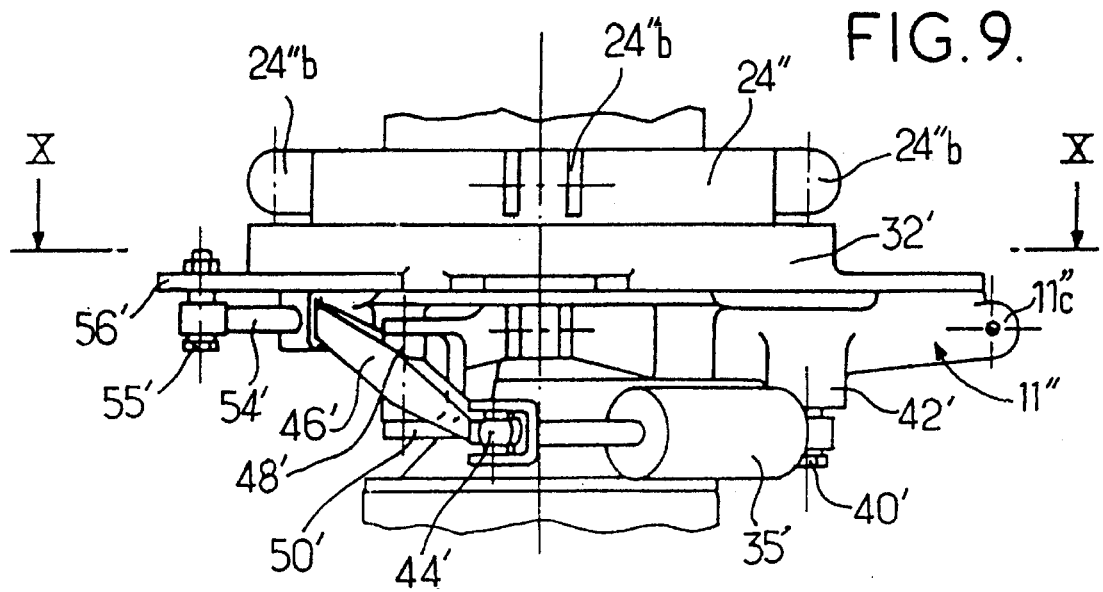
Figure 10:
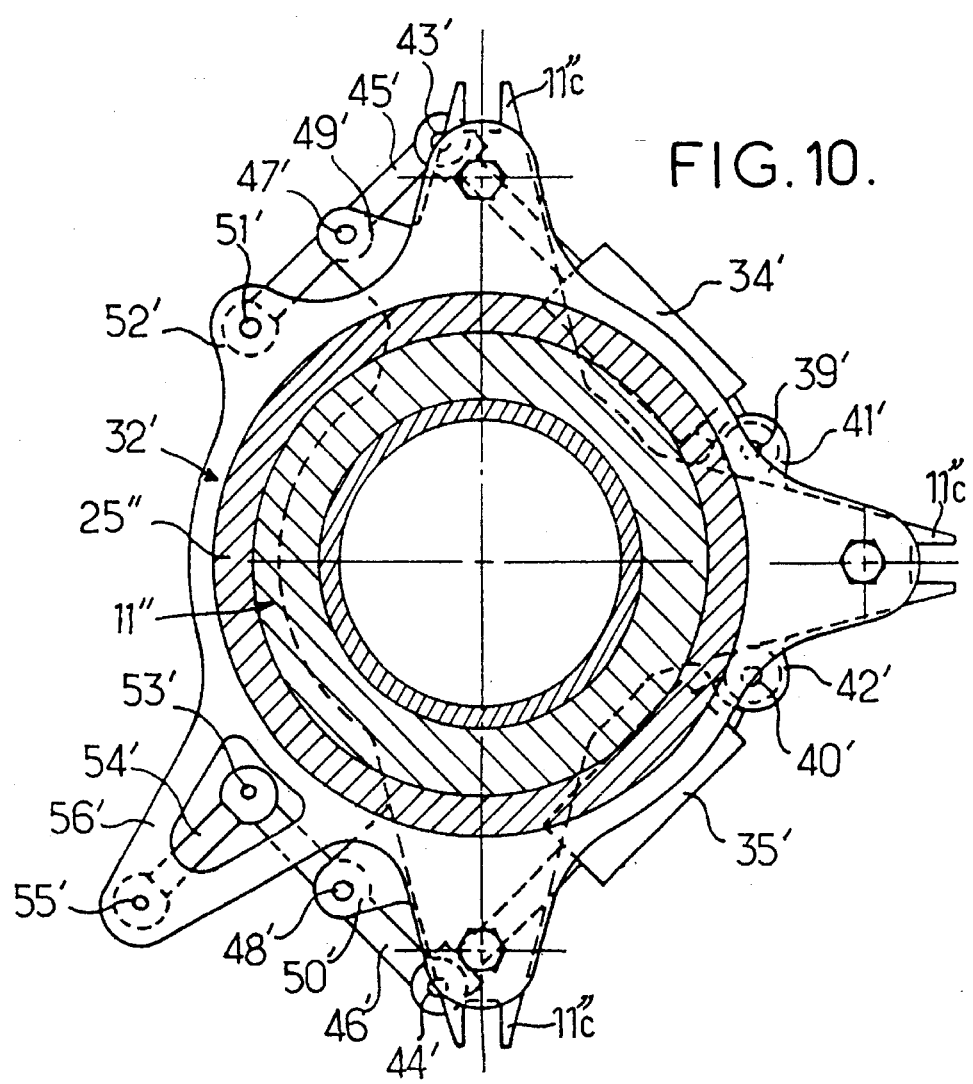
Figure 11:
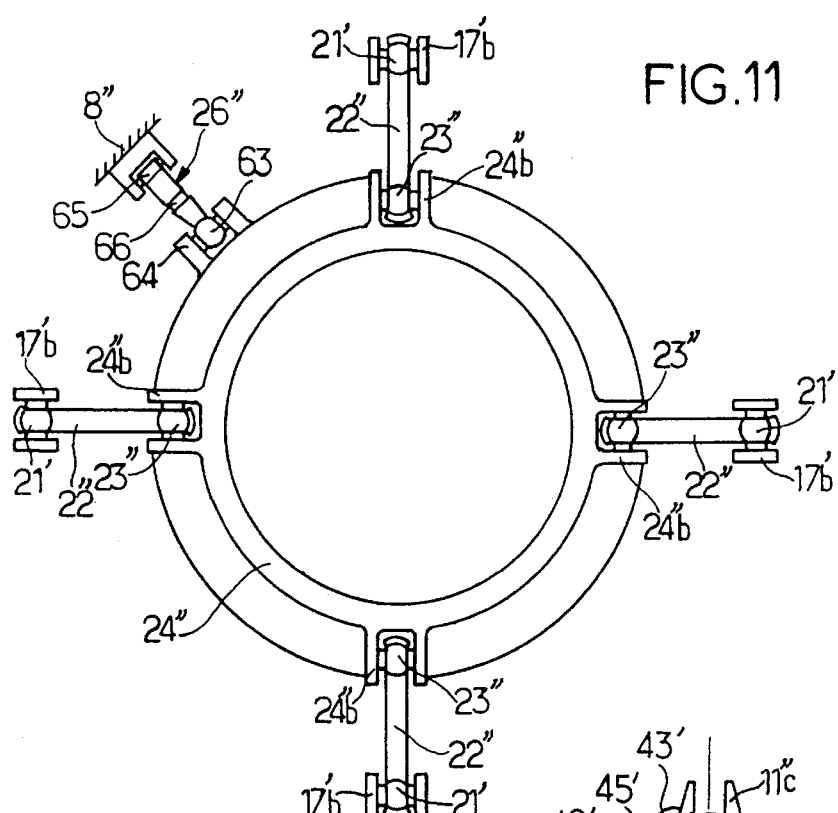
Figure 12:
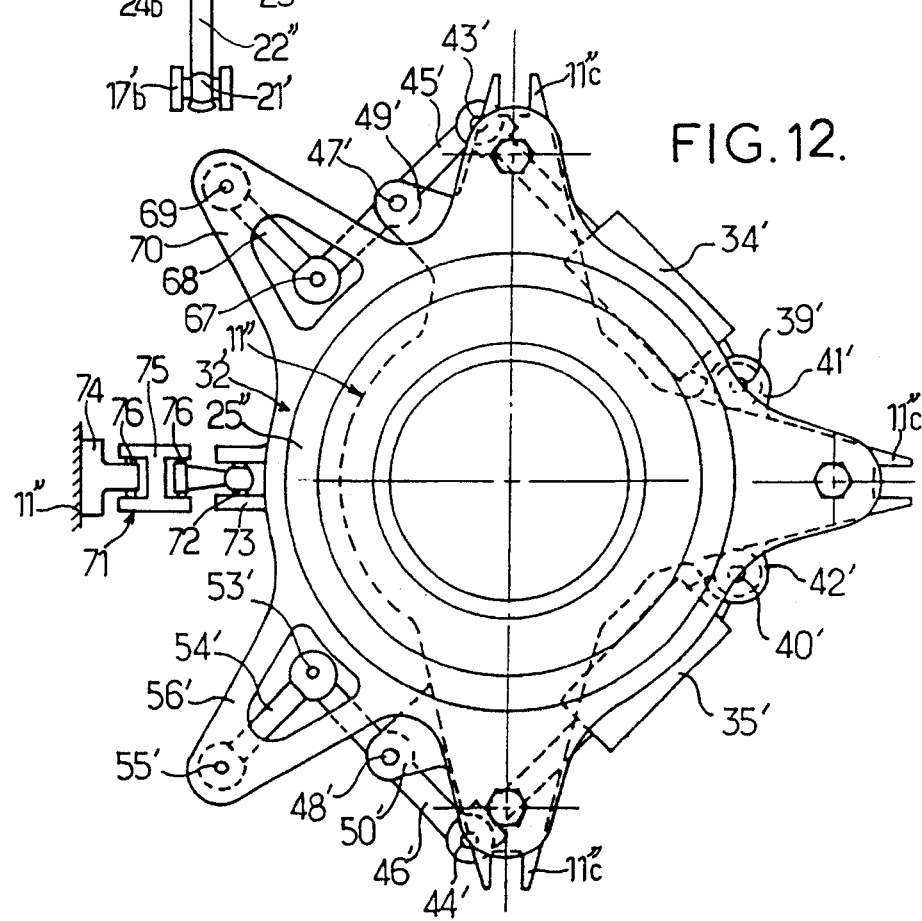

Further characteristics and advantages of the invention will emerge from the description given hereinbelow without any limitation being implied, of embodiments described with reference to the appended drawings in which:

FIG. 1 represents diagrammatically and in axial section a helicopter main rotor and a first example of a pitch-control device according to the invention, limited to one blade, FIG. 2 is a diagrammatic view from above in direction II of FIG. 1 of the pitch-control device, the articulated links of which are represented folded in the plane of FIG. 1, FIG. 3 is a diagrammatic view in axial section of a second example of a pitch-control device, FIG. 4 is a diagrammatic plan view of the off-centering system of the device of FIG. 3, FIG. 5 is a diagrammatic view of a third example of a pitch-control device, in axial section on the plane V—V of FIG. 6, for a four-bladed rotor, FIGS. 6 and 7 are diagrammatic sectional views on Lines VI—VI and VII—VII of FIG. 5, respectively, FIG. 8 is a partial view in side elevation on line VIII—VIII of FIG. 5, FIG. 9 is a view in external side elevation of the lower part of the device of FIG. 5, FIG. 10 is a diagrammatic sectional view on line X—X of FIG. 9, and FIGS. 11 and 12 are views similar respectively to FIGS. 7 and 10 for embodiment variations.

In the various examples of devices described hereinbelow, the same numerical references are used to denote the identical or similar elements of the devices, and are sometimes given a symbol ' or ".

In FIG. 1, a helicopter main rotor 1, represented diagrammatically, comprises a rotor mast 2 driven in rotation by its base about the axis of rotation A—A of the rotor, and secured at its upper end to a hub 3. Each of the blades such as 4 of the rotor is joined to the hub 3 so as to be driven in rotation with the latter about the rotor axis A—A, and so as to be able to pivot with respect to the hub 3 about its longitudinal pitch-change axis X—X, which is substantially radial with respect to the axis A—A. In order to alter the pitch of the blade 4, or its angle of incidence about its pitch axis X—X, the blade 4 is secured in terms of rotation about this axis X—X to a pitch lever 5. In order to control the pitch of the blade 4, the lever 5 is controlled by a pitch rod 6, substantially parallel to the rotor axis A—A and joined by its lower edge to the rotating plate 8 of a swashplate mechanism 7.

In this mechanism 7, in a conventional manner, the rotating plate 8 is driven in rotation by the rotor mast 2 with the aid of at least one rotating scissors fitting 9 articulated by one end to the mast 2 and by the other end to the rotating plate 8. The latter is additionally mounted so that it can rotate, with the aid of a ball-bearing 10, coaxially on a non-rotating plate 11 which can be inclined in any direction with respect to the axis A—A about the mast 2 while being mounted by its hub 11a about a central ball joint 12, and which can be moved in translation parallel to the rotor axis A—A by the axial sliding of the ball joint 12 about a cylindrical tubular guide 13 which cannot rotate because it is fixed to stationary points of the helicopter structure. The non-rotating plate 11 is held back against any rotation about the rotor axis A—A by a non-rotating scissors fitting 14 articulated by one end to the non-rotating plate 11 and by the other to the base of the cylindrical guide 13. The tilting and translational movements of the non-rotating plate 11 are controlled by flight-control actuators, generally numbering three, and just one 15 of which is represented in FIG. 1, it being possible for these to be rods, rams or servo controls.

In the conventional pitch-control devices, the lower end of each pitch rod 6 is articulated directly to the rotating plate 8.

However, in this first embodiment of a device of the invention, for each blade 4, an articulated link 16 comprising two arms 17 and 18 and three articulations 19, 20 and 21 is mounted in series between the rotating plate 8 and the pitch rod 6. The first arm 17 of this link 16 is Joined by its lower end by the first articulation 19 to a fixed point on the perimeter of the rotating plate 8, while the upper end of the second arm 18 of the link 16 is Joined by the second articulation 20 to the lower end of the pitch rod 6.

In addition, the articulated link 16 is also articulated by the third articulation 21 to the outer radial end of a control lever 22 specific to each articulated link 16, and the inner radial end of which is joined by an articulation 23 to a fixed point on the perimeter of an auxiliary plate 24.

The plate 24, of annular shape and circular section is mounted so that it can rotate by means of a ball-bearing 25 about the upper part 11b of the hub 11a of the non-rotating plate 11, this upper part 11b being cylindrical of circular section, but off-centered by an amount which is fixed and predetermined by construction with respect to the axis of the non-rotating plate 11. Two rotating scissors fittings, such as 26, are each articulated by one end in an outer radial clevis of the auxiliary plate 24 and by the other end in an upper clevis of a support lug 27 of the rotating plate 8, so that the auxiliary plate 24 is driven in rotation by the rotating plate 8. In addition, each articulated link 16 is also articulated by the second articulation 20 to the outer radial end of a second lever 28 which is specific to this link 16 and the inner radial end of which is articulated by the articulation 29 in a clevis at the upper end of a support lug 30 of the rotating plate 8, this lug 30 exhibiting a passage 31 through which the corresponding control lever 22 passes because, in this architecture, the rotating plate 8 is located axially between the non-rotating plate 11 and the auxiliary plate 24.

It should be noted that the articulations of the control lever 22 and of the second lever 28 to the articulated link 16 may be not coincident respectively with the third and second articulation 21 and 20, but may take place, for the lever 22, at any point whatsoever on the arms 17 and 18 other than the articulations 19 and 20, the arms 17 and 18 then being articulated together by a fourth articulation and, for the lever 28, at a fifth articulation at some point on the arm 18 or on the lower part of the pitch rod 6.

As the auxiliary plate 24 is off-centered by a desired amount, this amount being fixed and predetermined by the structure of the non-rotating plate 11 and auxiliary plate 24 and by the way that one is mounted on the other via the rolling elements bearing 25, when the auxiliary plate 24 rotates with the rotating plate 8, each of the control levers 22 is moved substantially radially alternately outwards and inwards, and gives angular movements to the arms 17 and 18 of the corresponding articulated link 16 which moves the corresponding pitch rod 6 so as to control the pitch of the corresponding blade 4 in the desired manner, with a phase and an amplitude of a bicyclic component adapted to flight.

FIG. 2, in which the articulated links 16 are diagrammatically folded in the plane of the figure, represents the movements and deformations of the levers 22 and links 16 affording the desired pitch control. As the centre of rotation C24 of the auxiliary plate 24 is off-centered to the left of the central axis C11 of the non-rotating plate 11, and as the direction of rotation of the rotor is that of the arrow $\Omega$, as indicated in FIG. 2, for a given collective pitch and a given cyclic pitch, that is to say for a fixed axial position and for a fixed inclination, both given to the non-rotating plate 11 by the actuators 15 along and with respect to the axis A—A, the link 16 to the right in FIG. 2 occupies the position for minimum pitch of the corresponding blade 4, because the lever 22 and the articulation 21 are brought radially as close as possible towards the central axis C11, and the arms 17 and 18 of this link 16 are inclined inwards as far as possible with respect to the articulations 19 and 20. Starting from this position, in the right-hand lower sector of FIG. 2, the lever 22 and the articulation 21 are progressively moved radially outwards with respect to the central axis C11, which corresponds to a progressive increase in pitch as far as the position of the link 16 at the bottom in FIG. 2, for which the arms 17 and 18 are aligned in the extension of one another, which corresponds to an articulation 20 and to a pitch rod 6 which are lifted as far as possible, and therefore to a maximum pitch of the blade 4. Starting from this position, and as far as the position of the link 16 shown in the left of FIG. 2, that is to say in the left-hand lower sector of FIG. 2, the lever 22 and the articulation 21 continue to be moved progressively radially outwards due to the off-centering of the auxiliary plate 24 with respect to the non-rotating plate 11. The arms 17 and 18 are progressively inclined with respect to each other and inclined radially outwards with respect to the articulations 19 and 20, which corresponds to a lowering of the articulation 20, and therefore to a downwards pulling force on the pitch rod 6, therefore to a progressive decrease in the pitch of the blade 4, from maximum pitch for the lower position in FIG. 2, to minimum pitch for the left-hand position, diametrically opposite the right-hand position corresponding also to minimum pitch. Then, in the left-hand upper sector of FIG. 2, the lever 22 and the articulation 21 are progressively brought radially closer to the central axis C11, so that the arms 17 and 18 come back inwards as far as their position of alignment, which corresponds to an increase in the pitch as far as maximum pitch for the link 16 at the top in FIG. 2, and finally, on the right-hand upper sector of the rotor, the arms 17 and 18 are inclined with respect to one another and are inclined radially towards the inside of the articulations 19 and 20, which corresponds to another progressive decrease in pitch as far as the position of minimum pitch to the right in FIG. 2.

Thus, over a complete rotation of the rotor, therefore over one cycle, the articulated links 16, the control levers 22 and the rotary and eccentric auxiliary plate 24 alternately control two symmetric decreases and two symmetric increases in the pitch of each blade 4, which increases and decreases are added to the collective pitch and cyclic pitch resulting from the axial position and from the inclination of the non-rotating plate 11, that is to say that the device of the invention introduces a bicyclic pitch component, the amplitude and phase of which are defined by the geometry of the links 16, of the control levers 22, of the auxiliary plate 24 and of the eccentricity of the latter with respect to the non-rotating plate 11.

By comparison with the example of FIG. 1, the pitch-control device of FIGS. 3 and 4 exhibits three main differences, which are the location of the auxiliary plate 24' axially between the non-rotating plate 11' and the rotating plate 8', the fact that the auxiliary plate 24' is driven in rotation by the rotating plate 8' with the aid of a control lever 22', of an articulated link 16 and of a second lever 28, instead of the rotating scissors fitting 26 of FIG. 1, and above all, an eccentricity of the auxiliary plate 24' as defined with respect to the non-rotating plate 11', which is variable and determined by an off-centering system supported by the non-rotating plate 11'.

In FIG. 3, the rotating plate 8' is mounted in rotation by the ball-bearing 10' coaxially about the upper part 11'b of the non-rotating plate 11', while the auxiliary plate 24' is mounted so that it can move transversely, so as to have the desired eccentricity, in a radial plane with respect to the axis of the non-rotating plate 11', and is housed in a radial recess 33, open towards the outside and delimited between the lower part of the non-rotating plate 11', its hub 11'a and its upper part 11'b. As a result of this, for each articulated link 16, identical to that of the previous example, that is to say in which the two arms 17 and 18 are articulated together by one end with the aid of a central articulation 21, and in which the arm 17 is articulated by its other end to the rotating plate 8' by the articulation 19, while the arm 18 is articulated at 20 by its other end simultaneously to the lower end of the corresponding pitch rod 6 and to the outer end of the second corresponding lever 28, itself articulated by its inner end 29 to the lug 30 on the rotating plate 8', the rotating plate 8' exhibits, in a tapering part between the lugs 30 and the outer clevises receiving the articulations 19, a passage 31' made at the base of each corresponding lug 30, for the passage of the corresponding control lever 22', articulated at 23' by its inner end to the auxiliary plate 24' and by its outer end to the central articulation 21.

The rotating plate 8' is secured in terms of rotation to the rotor mast 2 by the rotating scissors fitting 9' articulated by one end to a clevis of the mast 2 and by the other end in the upper clevis of a lug 30 by the articulation 29 of the second corresponding lever 28, so that this second lever 28, the corresponding articulated link 16 and the corresponding control lever 22' transmit the rotation of the rotating plate 8' to the auxiliary plate 24'.

As before, the hub 11'a of the non-rotating plate 11', held by the non-rotating scissors fitting 14, can be inclined on the ball joint 12 which can slide along the tube 13 fixed around the rotor mast 2, by the manoeuvres of three flight-control actuators (not represented) articulated on the non-rotating plate 11'.

As in the example of FIG. 1, the auxiliary plate 24' is off-centered with respect to the non-rotating plate 11' by a value defined such that each of the levers 22' controls the pitch of the corresponding blade by applying to it a bicyclic component, the phase and amplitude of which are adapted to the flight configuration by the defined eccentricity which, in this example of FIGS. 3 and 4, is variable and obtained by means of an off-centering system supported by the non-rotating plate 11' and represented in the lower part of FIG. 3 and in FIG. 4.

This off-centering system comprises a non-rotating intermediate plate 32 held axially on the non-rotating plate 11' but mounted so that it can slide transversely in a radial plane with respect to the non-rotating plate 11' in the annular housing 33 delimited therein about the hub 11'a, and the auxiliary plate 24' is mounted so that it can rotate about the intermediate plate 32 with the aid of the ball-bearing 25'. The off-centering system additionally comprises two actuators 34 and 35, just one of which is represented in FIG. 3, for controlling the movements of the moving assembly consisting of the intermediate plate 32, the rolling elements bearing 25' and the auxiliary plate 24' with respect to the non-rotating plate 11'. The actuators 34 and 35 are linear, identical to each other, consist for example of electric rams or servo controls, and are mounted beneath the non-rotating plate 11'. Each of the actuators 34 and 35 controls the movements of the intermediate plate 32 in respectively one of two different directions, so as to give the moving assembly 32-25'-24' the position which gives the desired eccentricity of the auxiliary plate 24'. To this end, the actuators 34 and 35 are driven by a computer 36, fixed to the structure of the helicopter, and which formulates control commands transmitted to the actuators 34 and 35 on the basis of signals received at 37 from the flight controls, for example datum point signals regarding the position of the actuators such as 15 in FIG. 1, controlling the position of the non-rotating plate 11', and signals regarding flight parameters, received at 38.

The actuators 34 and 35 are each articulated by one end of their cylinder or body respectively at 39 and at 40 to a support 41 or 42 fixed to the perimeter of the non-rotating plate 11', and by the end of their rod respectively at 43 and 44 to one end of one of two identical cranked rods 45 and 46 respectively, articulated by their central part respectively at fixed points 47 and 48 to respectively one of two lugs 49 and 50 projecting radially outwards from the perimeter of the non-rotating plate 11'.

The other end of one of the rods 45 is articulated at a fixed point 51 to the end of a lug 52 projecting radially outwards from the perimeter of the intermediate plate 32, which halts the rotation of the plate 32, while the other end of the other rod 46 is articulated at 53 to the outer radial end of a connecting rod 54, articulated at a fixed point 55 by its inner radial end to a lug 56 fixed to the perimeter of the intermediate plate 35. This connecting rod 54 is intended to provide two degrees of freedom and avoid a second halting in rotation of the non-rotating intermediate plate 32 because the transverse sliding movements of the plate 32 in the plane of FIG. 4 (radial plane for the non-rotating plate 11') would otherwise be prevented, and the intermediate plate 32 would be blocked.

By virtue of the cranked rods 45 and 46, each of the actuators 34 and 35 controls the movements of the intermediate plate 32 in respectively one of two substantially orthogonal directions.

As far as the rest is concerned, this device of FIGS. 3 and 4 operates like the one of FIG. 1, and as explained with reference to FIG. 2.

The example of a pitch-control device of FIGS. 5 to 10 has in common with that of FIGS. 3 and 4 that the eccentricity of the auxiliary plate 24" as defined with respect to the non-rotating plate 11" is variable and determined by a similar off-centering system supported by the non-rotating plate 11" and comprising a non-rotating intermediate plate 32', on which the auxiliary plate 24" is mounted so that it can rotate, and two actuators 34' and 35' each interacting with respectively one of two rods 45' and 46' so as to move the intermediate plate 32' transversely with respect to the non-rotating plate 11" and also that the auxiliary plate 24" and the intermediate plate 32' are located axially between the non-rotating plate 11" and the rotating plate 8".

However, an important difference in the device of FIGS. 5 to 10 as compared with that of FIGS. 3 and 4 and as compared with that of FIG. 1 is that the articulated link 16' for each blade comprises Just one arm 17', of which the upper end, formed as a clevis 17'*a*, is joined to the lower end of the corresponding pitch rod 6 by the articulation 20' consisting of a ball joint end fitting of the rod 6 held in the clevis 17'*a* by a transverse pin, the lower end of the arm 17', also formed as a clevis 17'*b*, being Joined to the outer end of the corresponding control lever 22" by an articulation 21' also consisting of a ball joint end fitting of the lever 22" held in the clevis 17'*b* by a transverse pin, while via its central part, between the clevises 17'*a* and 17'*b*, the arm 17' is Joined to the rotating plate 8" by the articulation 19' consisting of an outer radial clevis 8"*a* at the end of one of the four radial arms 8"*b* of the rotating plate 8", intended for a four-bladed rotor (see FIGS. 6 and 8).

In this example, the rotating plate 8" is mounted so that it can rotate via the ball-bearing 10" coaxially about the upper part 11"*b* of the hub 11"*a* of the non-rotating plate 11", being driven in rotation by two rotating scissors fittings such as 9", each articulated by its upper end to the rotor mast 2' and by its lower end in an outer radial clevis 8"*c* of the rotating plate 8" (see FIGS. 5 and 6), while the non-rotating plate 11" on the one hand is joined to a fixed point of the helicopter structure by the non-rotating scissors fitting 14' represented partially in FIG. 5, and articulated by the lower end of its hub 11"*a* and, on the other hand, can be inclined with respect to the axis A—A of the mast 2 and slide along the latter, being mounted by the upper part 11"*b* of its hub 11"*a* about the ball joint 12' which can slide along the fixed tubular guide 13' surrounding the rotor mast 2', the non-rotating plate 11" being manoeuvred by three flight-control rods, such as the one represented diagrammatically at 15', each one articulated by its upper end in respectively one of three outer radial clevises 11"*c* of the non-rotating plate 11".

The auxiliary plate 24" has the shape of a length of cylinder of circular section located around the hub 11"*a*, axially between the rotating plate 8" and the non-rotating plate 11" and mounted so that it can rotate by the ball-bearing 25" inside a coaxial central cylindrical bearing surface 32'*a* of the intermediate plate 32' held axially on the non-rotating plate 11' but mounted so that it can slide transversely on the latter via means described hereinbelow.

The upper axial part of the auxiliary plate 24" exhibits four outer radial clevises, one of which, 24"*a*, is wider than the other three 24"*b*, identical to each other. In each of the clevises 24"*b*, a transverse pin holds a ball joint of the inner end of respectively one of three straight and identical control levers 22", to constitute the articulation 23" joining this lever 22" to the auxiliary plate 24", while the fourth control lever 22"*a* is of triangular shape and wider than the other three levers 22", in order to act simultaneously as a scissors fitting by means of which the auxiliary plate 24" is driven in rotation by the rotating plate 8", via the corresponding arm 17'. This control lever 22"*a* is articulated to the auxiliary plate 24" by its inner end shaped as a bushing held in the widened clevis 24"*a* by a transverse pin, so as to form the articulation 23'*a* (see FIG. 7).

In the alternative form of FIG. 11, the rotational drive of the auxiliary plate 24" by the rotating plate 8" is provided by a rotating scissors fitting 26", the end of one branch of which is articulated by a ball joint 63 in an outer radial clevis 64 of the auxiliary plate 24". The end of the other branch of the scissors fitting 26" is articulated to the rotating plate 8" by a pivoting link 65, and the two branches of the scissors fitting 26" are articulated together by another pivoting link 66. The four links of the control levers 22" to the auxiliary plate 24" and to the clevises 17'*b* of the arms 17' are therefore identical to those provided by the clevises 24"*b* receiving the ball joints of the articulations 23" of FIG. 7, and the four levers 22" are straight and identical to each other.

The intermediate plate 32' is held axially on the non-rotating plate 11" by bolts such as 58, with heads pressed against the upper face of a small plate 59 above the upper face of the intermediate plate 32', and covering a slot 60 made in this intermediate plate 32', and through which there passes a tubular spacer piece 61, itself having the shank of the corresponding bolt 58 passing through it, which shank also passes through the non-rotating plate 11', and onto the lower end of which a nut 62 is screwed, the height of the spacer piece 61 being slightly greater than the depth of the slot 60 so as to have clearance between the small plate 59 and the upper face of the intermediate plate 32', this clearance allowing the intermediate plate 32' to slide in a radial plane with respect to the non-rotating plate 11" upon the command to off-center to the desired value ensuring, as in the previous examples, that each control lever 22" or 22"*a* controls the pitch of the corresponding blade by applying to it a bicyclic component controlled in terms of phase and in terms of amplitude adapted to the flight configuration.

To this end, the two actuators 34' and 35' of the off-centering system are mounted beneath the non-rotating plate 11" and each control the movements of the intermediate plate 32' in respectively one of two different directions, so as to give the desired eccentricity to the moving assembly consisting of the intermediate plate 32', of the auxiliary plate 24" and of the ball-bearing 25".

Each actuator 34' or 35' is articulated on the one hand at 39' or 40' respectively via the end of its body to a support 41' or 42' respectively projecting from the perimeter of the non-rotating plate 11" and, on the other hand, at 43' or 44' respectively via the end of its rod to one end of a straight rod 45' or 46' respectively articulated respectively in its central part at a fixed point 47' or 48' to a support 49' or 50' respectively projecting from the perimeter of the non-rotating plate 11".

Via its other end, the straight rod 45' is articulated at a fixed point 51' to a support 52' projecting from the perimeter of the intermediate plate 32' in order to halt the rotation of the latter, while the other end of the straight rod 46' is articulated at 53' to the inner radial end of a connecting rod 54' intended for not blocking the plate 32' and articulated by its outer radial end at a fixed point 55' to the outer radial end of a support 56' projecting from the perimeter of the intermediate plate 32'. In that way, each pairing consisting of an actuator 34' or 35' and of a rod 45' or 46' moves the intermediate plate 32' in respectively one of two substantially mutually orthogonal directions, the two actuators being identical to one another as are the two rods.

In the alternative form of FIG. 12, the way in which the straight rods 45' and 46' are mounted is identical and symmetrical, because the other end of the rod 45' is, as for the rod 46', articulated at 67 to the inner radial end of a second connecting rod 68, identical to the connecting rod 54', and articulated by its outer radial end at a fixed point 69 to the outer radial end of another support 70 projecting from the perimeter of the intermediate plate 32'. In this case, the rotation of the intermediate plate 32' is halted by a non-rotating scissors fitting 71, one branch of which is articulated by a ball joint 72 in a clevis 73 of the intermediate plate 32', the other branch of which is articulated by a pivoting link 74 to the non-rotating plate 11" and the two branches of which are each articulated to a central H-shaped part 75 of the scissors fitting 71 by a pivoting link 76.

This device operates like the one described hereinabove with reference to FIGS. 3 and 4.

As an alternative, in a device similar to that of FIG. 5, the rotating plate 8" may be located axially between the auxiliary plate 24" and the non-rotating plate 11". In this case, each articulated link 16' has its one single lever 17' articulated by its lower end to the rotating plate 8" and in its central part to the outer end of the corresponding control lever 22", while its upper end remains articulated to the lower end of the corresponding pitch rod 6.

I claim:

1. A device for controlling pitch of blades of a rotorcraft rotor, in which each blade is, on the one hand, driven in rotation about an axis of rotation of a rotor mast via a hub and, on the other hand, secured in terms of rotation about a longitudinal pitch-change axis to a pitch lever controlled by a pitch rod joined to a plate which rotates with the rotor mast and belongs to a swashplates mechanism, in which the rotating plate is mounted so that it can rotate on a non-rotating plate which can slide axially along the rotor mast and be inclined in any direction with respect to the rotor mast under the action of flight-control actuators, wherein the device comprises:

an auxiliary plate, secured in terms of rotation to the rotating plate and mounted so that it can rotate with defined eccentricity on the non-rotating plate, and for each blade, an articulated link which comprises at least one arm via which the link is joined to the rotating plate by a first articulation and which link is mounted in series with the corresponding pitch rod, the link being joined to this pitch rod by a second articulation separate from the first articulation, and by a third articulation via which the articulated link is joined to a control lever, which is articulated to the rotating and eccentric auxiliary plate so that the rotation of the latter induces, via each control lever, angular movements of each arm of the corresponding articulated link, which moves the corresponding pitch rod so as to control the pitch of the corresponding blade.

2. A pitch-control device according to claim 1, wherein each articulated link comprises a single arm joined by an end part to one end of the corresponding pitch rod by the second articulation, and via its opposite end part to one of the first and third articulations of the articulated link respectively on the rotating plate and on an end part of the corresponding control lever, and the control lever is articulated via its opposite end part to the auxiliary plate, while the arm is articulated, between its end parts, to the other of the first and third articulations of the articulated link.

3. A pitch-control device according to claim 2, wherein the auxiliary plate is mounted axially between the rotating plate and the non-rotating plate, and the single arm of each articulated link is joined by the opposite end part to the control lever by the third articulation and, between its end parts, to the rotating plate by the first articulation.

4. A pitch-control device according to claim 1, wherein each articulated link comprises two arms articulated together by a fourth articulation separate from the first articulation and the second articulation, and a first arm of which is joined to the rotating plate by the first articulation and a second arm of which is joined to the corresponding pitch rod by the second articulation, the corresponding control lever being joined to at least one of the two arms by the third articulation, while a second lever is additionally articulated by a fifth articulation to the articulated link and/or the corresponding pitch rod and additionally to the rotating plate.

5. A pitch-control device according to claim 4, wherein for each articulated link, the third and fourth articulations are coincident.

6. A pitch-control device according to claim 4, wherein for each articulated link, the second and fifth articulations are coincident.

7. A pitch-control device according to claim 4, wherein the rotating plate is mounted axially between the non-rotating plate and the auxiliary plate and exhibits, for each articulated link, a support on which one end of the second corresponding lever is articulated and through which the corresponding control lever passes.

8. A pitch-control device according to claim 4, wherein the auxiliary plate is mounted axially between the non-rotating plate and the rotating plate, and the latter exhibits, for each articulated link, a passage through which the corresponding control lever passes and a support to which one end of the second corresponding lever is articulated.

9. A pitch-control device according to claim 1, wherein the auxiliary plate is mounted so that it can rotate on the non-rotating plate with the aid of at least one rolling elements bearing which is off-centered with respect to the axis of the non-rotating plate.

10. A pitch-control device according to claim 1, wherein the auxiliary plate is driven in rotation by the rotating plate by means of at least one rotating scissors fitting articulated, on the one hand, to the rotating plate and, on the other hand, to the auxiliary plate.

11. A pitch-control device according to claim 1, wherein the auxiliary plate is driven in rotation by the rotating plate by means of at least one control lever and by means of at least one arm of at least one corresponding articulated link.

12. A pitch-control device according to claim 1, wherein the eccentricity of the auxiliary plate as defined with respect to the non-rotating plate is fixed and predetermined by the structure of the plates and by the way in which the auxiliary plate is mounted on the non-rotating plate.

13. A pitch-control device according to claim 1, wherein the eccentricity of the auxiliary plate as defined with respect to the non-rotating plate is variable and determined by an off-centering system supported by the non-rotating plate.

14. A pitch-control device according to claim 13, wherein the off-centering system comprises, on the one hand, an intermediate plate held axially with respect to the non-rotating plate but mounted so that it can slide in a radial plane with respect to the non-rotating plate, and on which the auxiliary plate is mounted so that it can rotate with the aid of at least one rolling elements bearing and, on the other hand, at least two actuators supported by the non-rotating plate and each controlling the movements of the intermediate plate with respect to the non-rotating plate in respectively one of two different directions, in order to give the defined eccentricity to a moving assembly comprising the auxiliary plate, the intermediate plate and the rolling elements bearing or bearings interposed between them.

15. A pitch-control device according to claim 14, wherein each of the two actuators is articulated via one end to the non-rotating plate, and via the other end close to one end of respectively one of two rods each articulated at its central part at a fixed point to the non-rotating plate, the other end of one of the rods being articulated at a fixed point to the intermediate plate so as to halt the latter in terms of rotation, while the other end of the other rod is articulated to a connecting rod also articulated at a fixed point to the intermediate plate.

16. A pitch-control device according to claim 14, wherein each of the two actuators is articulated via one end to the non-rotating plate, and via the other end close to one end of respectively one of two rods each articulated in its central part at a fixed point to the non-rotating plate, and via its other end to a respective connecting rod also articulated at a respective fixed point to the intermediate plate, the rotation of which is halted by at least one non-rotating scissors fitting articulated, on the one hand, to the intermediate plate and, on the other hand, to the non-rotating plate.

17. A pitch-control device according to claim 15, wherein the two actuators are identical and the two rods are identical and each move the intermediate plate in respectively one of two substantially mutually orthogonal directions.

18. A pitch-control device according to claim 14, wherein the actuators are controlled by at least one computer receiving at least signals regarding the positions of the flight controls and/or at least signals regarding values of flight parameters.

19. A pitch-control device according to claim 14, wherein the actuators are chosen from the types comprising electric rams and servo controls.

20. A pitch-control device according to claim 14, wherein the intermediate plate is held axially on the non-rotating plate with the aid of at least one bolt passing through a tubular spacer piece located in a slot made in the intermediate plate so as to exhibit a clearance allowing the intermediate plate to slide with respect to the non-rotating plate in a radial plane with respect to the axis of the latter plate, under the control of the actuators of the off-centering system.

* * * * *